3,031,474
METHYL ETHER OF d,l-16,16-DIFLUORO-
EQUILENIN AND ITS PREPARATION
Leslie G. Humber, Dorval, Quebec, and Michael Kraml, Montreal, Quebec, Canada, assignors to American Home Products Corporation, New York, N.Y., a corporation of Delaware
No Drawing. Filed July 27, 1961, Ser. No. 127,119
3 Claims. (Cl. 260—397.45)

This invention relates to a new chemical compound, d,l-16,16-difluoroequilenin methyl ether, and to its preparation from available starting materials.

Our new chemical compound, a steroid, has the formula:

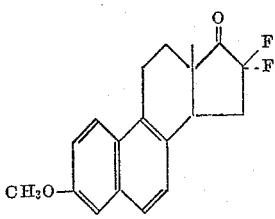

It may be readily prepared in two steps from d,l-equilenin methyl ether. This starting material is treated with ethyl formate in a step which is a modification of the method of Bardhan [J.C.S. (London) 1936, page 1848], to yield d,l-16-hydroxymethylene equilenin methyl ether. The latter compound, in turn, is reacted with perchloryl fluoride in the presence of potassium t-butoxide, following the procedure described by Robinson et al. [J.A.C.S. 82, page 5256 (1960)], to yield the desired new chemical compound.

This series of chemical reactions may be represented as follows:

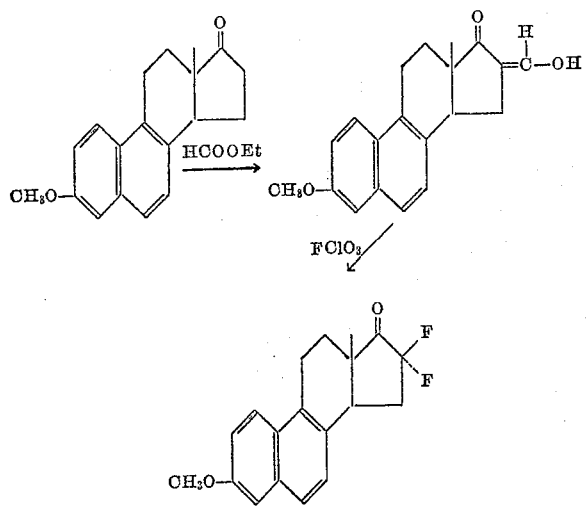

The new chemical compound is a valuable inhibitor of cholesterol biosynthesis. This property has now been recognized as being of great potential value in the treatment of atherosclerosis both in animals and in human beings. Animals, in the treatment of which the compound has potential value, include small pets and larger animals, such as horses, especially race horses which are kept for stud purposes.

Our new compound is also a valuable intermediate in the preparation of steroids wherein fluorine groups are present in the 16-position and of steroids containing double bonds in positions analogous to those in which they are present in d,l-16,16-difluoroequilenin methyl ether, or of steroids the synthesis of which requires such groupings. Thus the compound may be transformed by partial hydrogenation into the corresponding derivative of esterone (which is known to possess valuable pharmacological properties as evidenced by Robinson et al., cited above).

At a concentration of $10^{-3}$ M, d,l-16,16-difluoroequilenin methyl ether causes a 33.3 percent inhibition of incorporation of mevalonate-2-$C^{14}$ into cholesterol.

The following examples are illustrative of our invention.

EXAMPLE 1 d,l-16-Hydroxymethylene-Equilenin Methyl Ether

A mixture of d,l-equilenin methyl ether (9.4 g.), ethyl formate (21.9 ml.) and sodium methoxide (from 1.57 g. of sodium) were refluxed in a 1:1 mixture of benzene: ether for three and one-half hours. The mixture was then allowed to stir overnight at room temperature; then it was extracted with water several times. The aqueous solution was acidified to pH 6 with dilute hydrochloric acid and extracted with methylene chloride to yield a yellow solid. Crystallization from methylene chloride-methanol yielded 7.5 g. of d,l-16-hydroxymethylene equilenin methyl ether. A sample was sublimed for analysis. It had M.P. 186–187° C.

Analysis confirmed the empiric formula $C_{20}H_{20}O_3$. Required: C, 77.9%; H, 6.54%. Found: C, 78.25%; H, 6.28%.

EXAMPLE 2 d,l-16,16-Difluoroequilenin Methyl Ether d,l-16-Hydroxymethylene-equilenin methyl ether (5.3 g.) was dissolved in t-butanol containing potassium t-butoxide. Into this mixture perchloryl fluoride was bubbled for sixteen minutes. During this period three additional portions of potassium t-butoxide were added. At the end of the reaction the butanol was removed by evaporation in vacuo and the residue was distributed between water and chloroform. The chloroform layer was washed with water, dried and evaporated. Chromatography on alumina followed by sublimation yielded d,l-16,16-difluoroequilenin methyl ether. It was crystallized from ether and had M.P. 220–224° C.

Analysis confirmed the empiric formula $C_{19}H_{18}O_2F_2$. Required: F, 12.01%. Found: F, 12.00, 12.44%.

We claim:
1. The compound d,l-16,16-difluoroequilenin methyl ether.
2. The process of preparing d,l-16,16-difluoroequilenin methyl ether which comprises heating d,l-equilenin methyl ether and ethyl formate to secure d,l-16-hydroxymethylene-equilenin methyl ether; and treating said latter compound with perchloryl fluoride in the presence of potassium t-butoxide, thereby securing d,l-16,16-difluoroequilenin methyl ether.
3. The process of preparing d,l-16,16-difluoroequilenin methyl ether which comprises refluxing a mixture of d,l-equilenin methyl ether, ethyl formate and sodium methoxide; allowing said reaction mixture to cool; extracting said reaction mixture with water; acidifying said extractant, and extracting said acidified solution with methylene chloride, thereby securing d,l-16-hydroxymethylene equilenin methyl ether; and subjecting said d,l-16-hydroxymethylene equilenin methyl ether to the action of perchloryl fluoride in the presence of potassium t-butoxide, thereby securing d,l-16,16-difluoroequilenin methyl ether.

No references cited.